United States Patent [19]

Renken

[11] Patent Number: 5,746,513
[45] Date of Patent: May 5, 1998

[54] TEMPERATURE CALIBRATION SUBSTRATE

[75] Inventor: Wayne Renken, San Jose, Calif.

[73] Assignee: SensArray Corporation, Santa Clara, Calif.

[21] Appl. No.: 877,978

[22] Filed: Jun. 18, 1997

Related U.S. Application Data

[63] Continuation of Ser. No. 299,863, Sep. 1, 1994, abandoned.

[51] Int. Cl.$^6$ .............................. G01K 7/06; G01K 1/14; G01K 1/16
[52] U.S. Cl. ...................... 374/179; 136/230; 136/232
[58] Field of Search ........................... 374/179; 136/230, 136/232, 233

[56] References Cited

U.S. PATENT DOCUMENTS

| | | | |
|---|---|---|---|
| 2,829,185 | 4/1958 | Macatician et al. | 374/179 |
| 4,787,551 | 11/1988 | Hoyt et al. | 228/179 |
| 4,904,091 | 2/1990 | Ward | 374/179 |
| 5,106,203 | 4/1992 | Napoli et al. | 374/179 |
| 5,232,509 | 8/1993 | Min et al. | 118/723 |
| 5,441,344 | 8/1995 | Cook III | 374/179 |

FOREIGN PATENT DOCUMENTS

| | | | |
|---|---|---|---|
| 0280952 | 9/1988 | European Pat. Off. | |
| 0001676 | 1/1979 | Japan | 374/179 |
| 0189527 | 7/1989 | Japan | 374/179 |
| 1201689 | 12/1985 | U.S.S.R. | 374/179 |

OTHER PUBLICATIONS

M.K. Peck et al., "Measurement of Transient Temperatures at the Centre of a Sphere," *J. Phys. E. Sci.Instrum.*, vol. 20, No. 4, Apr. 1987, pp. 395–398.

Anonymous, "Dynamic Thermocouple Probe for Slip Chip Joining Furnace," *IBM Technical Disclosure Bulletin*, vol. 14, No. 11, Apr. 1972, pp. 3227–3227.

Anonymous, "System Temperature Monitoring Using On-Chip Thermocouples," *IBM Technical Disclosure Bulletin*, vol. 36, No. 6B, Jun. 1993, pp. 467–468, XP000377454.

Abstract of SIR No. 693, 332, "Thermocouple Anchor," by Henry Newson, filed Aug. 27, 1946 and published Dec. 26, 1950.

*Primary Examiner*—Diego F.F. Gutierrez
*Attorney, Agent, or Firm*—Mark A. Haynes; Wilson, Sonsini, Goodrich & Rosati

[57] ABSTRACT

A temperature calibration substrate for producing increased temperature measurement accuracy. The temperature calibration substrate includes cavity means located below the surface of said substrate and thermocouple means disposed in the cavity for measuring the temperature of the substrate. The cavity means includes a cavity opening, an inner perimeter, and a length. Heat transfer means is disposed in the cavity means between the thermocouple means and the inner perimeter of the cavity means for transferring heat from the substrate to the thermocouple means. The cavity means is shaped to allow the thermocouple means to lay in close proximity to the substrate, and the thermocouple means is positioned substantially adjacent the inner perimeter of the cavity means and traverses the length of the cavity means thereby enhancing heat transfer efficiency from the substrate to the thermocouple means.

32 Claims, 5 Drawing Sheets

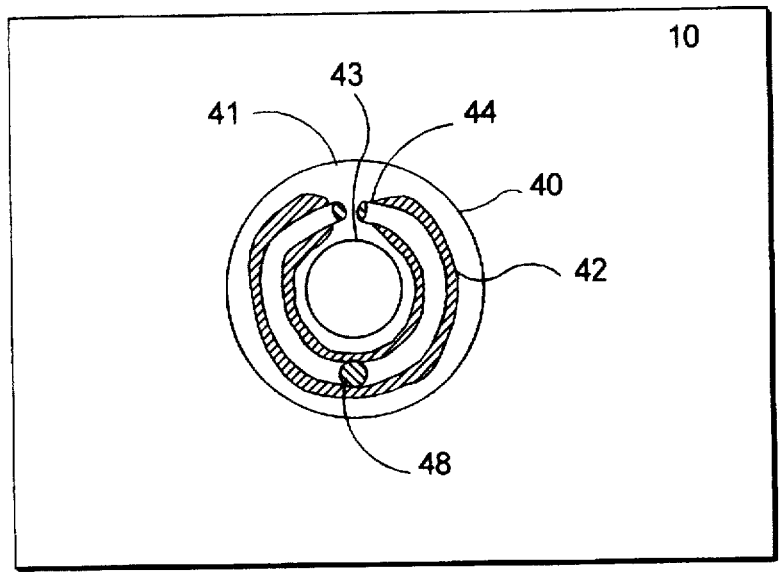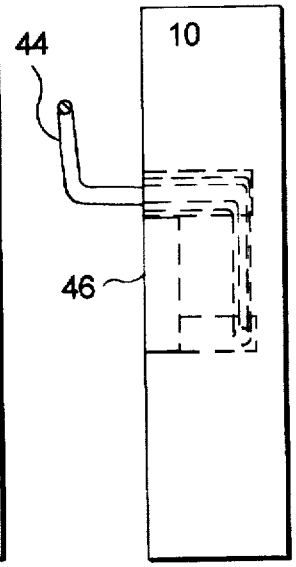
FIG. 4A            FIG. 4B
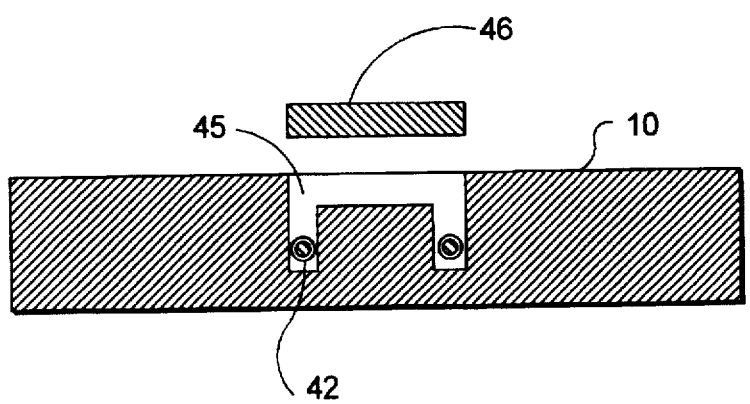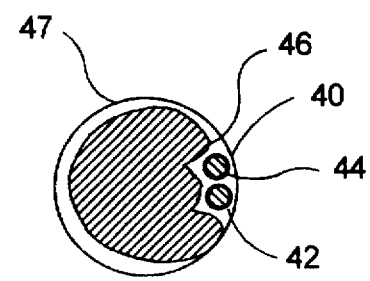
FIG. 4C            FIG. 4D

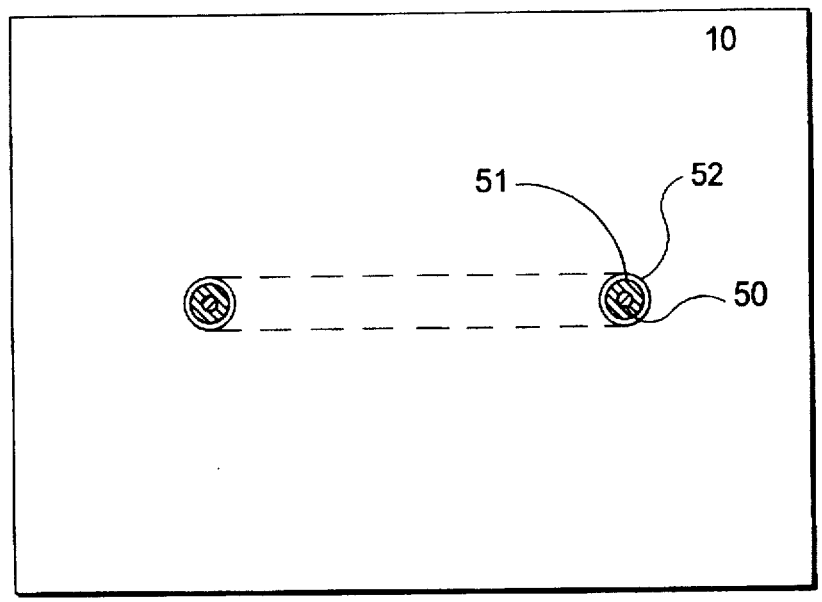
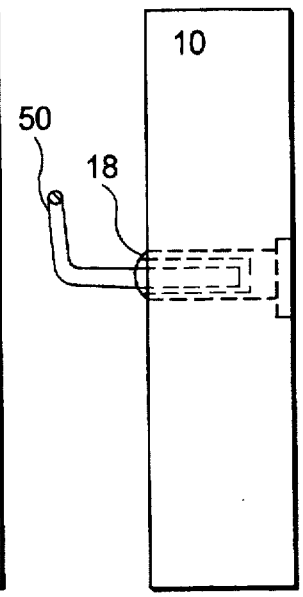
FIG. 5A
FIG. 5B
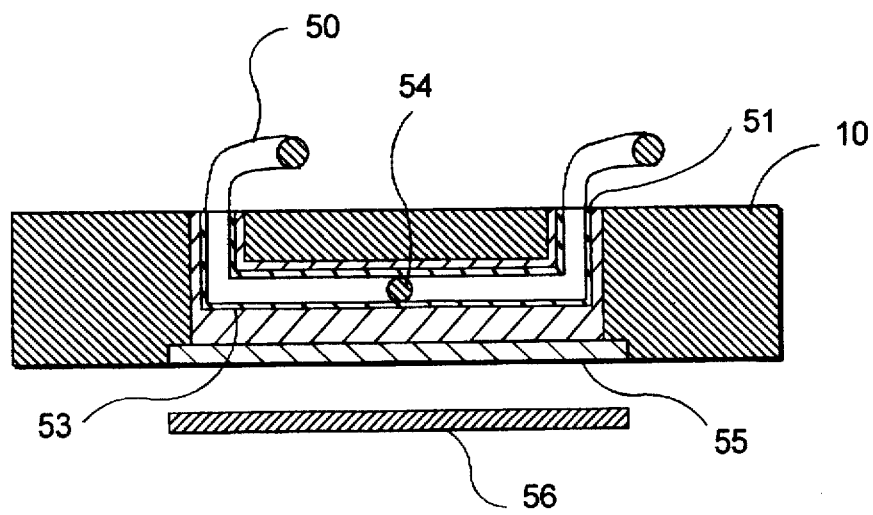
FIG. 5C

TEMPERATURE CALIBRATION SUBSTRATE

This application is a continuation of application Ser. No. 08/299,863, filed Sep. 1, 1994, now abandoned.

BACKGROUND OF THE INVENTION

1. Field of the Invention

The present invention relates in general to sensor technology and more specifically to wafer temperature measurement and calibration for semiconductor device thermal fabrication processes.

2. Description of the Prior Art

In the process of manufacturing semiconductor devices various reactions such as oxidation, annealing, and chemical or physical vapor deposition occur on the surface of material being processed. The physical properties of the material surface and surface films can vary greatly during such processing. Wafer temperature is a very influential parameter in controlling the physical properties of the material surface structure or films.

As such, control of wafer temperature and uniformity of wafer temperature is a key parameter for achieving process control and uniformity.

Wafer temperature control systems typically employ either of two wafer temperature sensing methods, namely non-contact method or contact method. Radiation thermometry or pyrometry is the principal method of direct non-contact temperature measurement but has several disadvantages. Chief among these disadvantages is the reliance on surface optical emissive properties which vary with temperature, doping level and film properties. There are several techniques of contact method temperature sensing. One common technique is the use of contact sensors which measure the temperature of a body that the wafer rests on such as a hot plate. However, in environments of moderate or high vacuum, the temperature difference between the body being sensed (hot plate) and the wafer is large enough to preclude accurate wafer temperature measurement.

Another common technique is the use of a sensor which directly contacts the surface of the wafer. The major source of error associated with this technique is that there is often greater heat transfer between the wafer and the structure holding the sensor in contact with the wafer than between the wafer and the sensor itself. The attachment of a thermocouple to a wafer is another method of contact temperature measurement. The attachment of a thermocouple to a wafer historically has been achieved either by bonding the thermocouple to the surface of the wafer or by imbedding it in the wafer. However, the impracticality of inserting thermocouples into production wafers limits the utility of thermocouple wafers in process control. On the other hand, the high accuracy of these thermocouple wafers allows them to be utilized to calibrate other contact and noncontact temperature sensors. More specifically, thermocouple wafers are used in equipment development, process diagnostics, in the qualification and requalification of process equipment and in system matching.

While thermocouples bonded into wafers generally provide greater accuracy than other contact or noncontact sensors, there are sources of measurement error that must be controlled in order to provide the highest measurement accuracy. Poor heat transfer between the thermocouple junction and wafer causes inaccurate temperature measurement. Furthermore, the thermal mass of the thermocouple and bond material, and the limited thermal conductivity of the bond material can cause a lag between measured and actual temperature during thermal transients.

Since thermocouple instrumented wafers have had limited commercial availability, an approach used by many semiconductor process and equipment engineers was to surface bond a thermocouple to a wafer. There were several limitations to this approach. One limitation was that the bond material had inadequate adhesion characteristics. As a result significant amount of bond material was utilized and this altered the absorptive and emissive characteristics of the wafer. Further, the bond material's thermal mass made its transient response lag the wafer's transient response significantly. In addition, the thermocouple was not adequately shielded from silicon and reacted to form silicides.

Another approach to overcome some of these thermocouple wafer problems is disclosed in U.S. Pat. No. 4,787,551. In U.S. Pat. No. 4,787,551 a silicon ball is formed enclosing the bead of a type C thermocouple and the ball is then electron beam welded to the silicon wafer. However, there were limitations to this technique, namely inadequate cleanliness of the interface at the weld site. Furthermore, the poor bond strength resulted in a fragile assembly and caused a low production yield. Additionally, a secondary junction was created between the silicon ball and the thermocouple wires which decalibrated the thermocouple. In many processing systems this caused erroneous readings due to a region of steep temperature gradients near the wafer. Furthermore, the choice of thermocouple materials was limited to alloys of tungsten and rhenium because at high temperatures other TC materials react more rapidly with silicon to form silicides that propagate through the wire causing wire breakage.

One approach to solving the problems associated with a thermocouple wafer was developed by the assignee of the present application. In this approach, a thermocouple was imbedded in a small blind re-entrant cavity and prevented from reacting with silicon by a ceramic film covering. The limitations of this approach were chiefly that the emissive and absorptive characteristics of the bond surface were different to that of the wafer surface. Additionally, the thermocouple's geometry in the cavity failed to maximize heat transfer into the thermocouple junction. Accordingly, improvements which overcome any and all of the problems are presently desirable.

SUMMARY OF THE INVENTION

It is therefore an object of the present invention to provide an improved method and apparatus for measuring the temperature of a substrate.

It is another object of the invention to provide an apparatus that limits the difference between emissive and absorptive characteristics of a bond surface and those of a substrate surface.

It is a further object of the invention to provide is a thermocouple junction shaped in geometries that enhance heat transfer in the bond area.

The present invention is a temperature calibration substrate for producing increased temperature measurement accuracy. The temperature calibration substrate includes cavity means located below the surface of said substrate and thermocouple means disposed in the cavity for measuring the temperature of the substrate. Heat transfer means is disposed in the cavity means between the thermocouple means and the inner perimeter of the cavity means for transferring heat from the substrate to the thermocouple means. The cavity means is shaped to allow the thermocouple means to lay in close proximity to the substrate, and the thermocouple means is positioned substantially adjacent the inner perimeter of the cavity means and traverses the length of the cavity means thereby enhancing heat transfer efficiency from the substrate to the thermocouple means.

The invention and objects and features thereof will be more readily apparent from the following detailed description and appended claims when taken in conjunction with the accompanying drawings.

BRIEF DESCRIPTION OF THE DRAWINGS

The accompanying drawings, which are incorporated in and form a part of this specification, illustrate embodiments of the invention and, together with the following detailed description, serve to explain the principles of the invention:

FIGS. 4A and 4B are a top view and side view, respectively, illustrating a temperature calibration wafer in accordance with the fourth preferred embodiment of the present invention.

FIG. 4C is a cross-sectional view of a temperature calibration wafer in accordance with the fourth preferred embodiment of the present invention.

FIG. 4D is a top view of a silicon cap and weld area of a temperature calibration wafer in accordance with the fourth preferred embodiment of the present invention.

FIGS. 5A, 5B and 5C are a top view and side views, respectively, illustrating a temperature calibration wafer in accordance with the fifth preferred embodiment of the present invention.

DETAILED DESCRIPTION OF ILLUSTRATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1A:
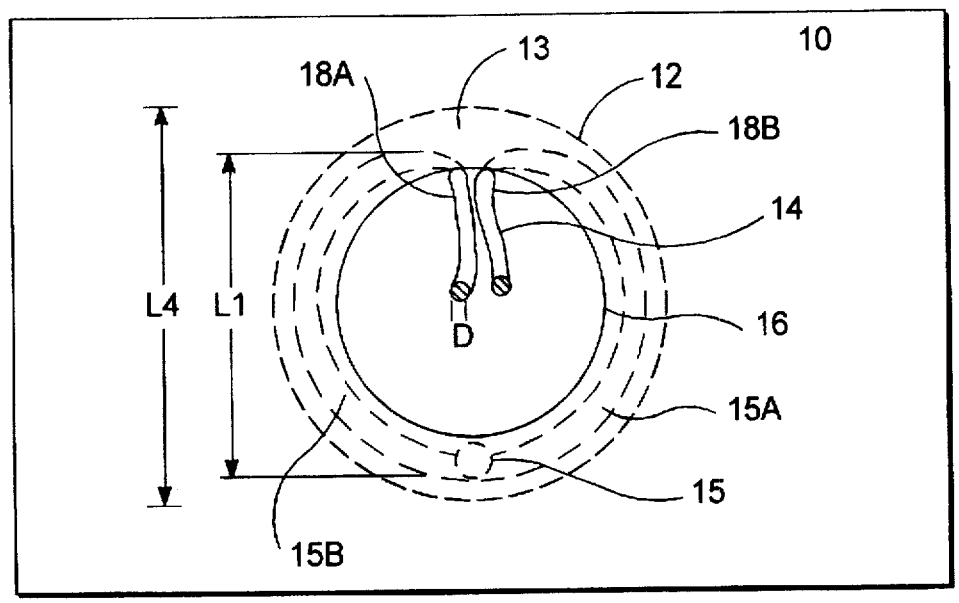
FIGS. 1A and 1B are a top view and side view, respectively, illustrating a temperature calibration wafer in accordance with the first preferred embodiment of the present invention.
Figure 1B:
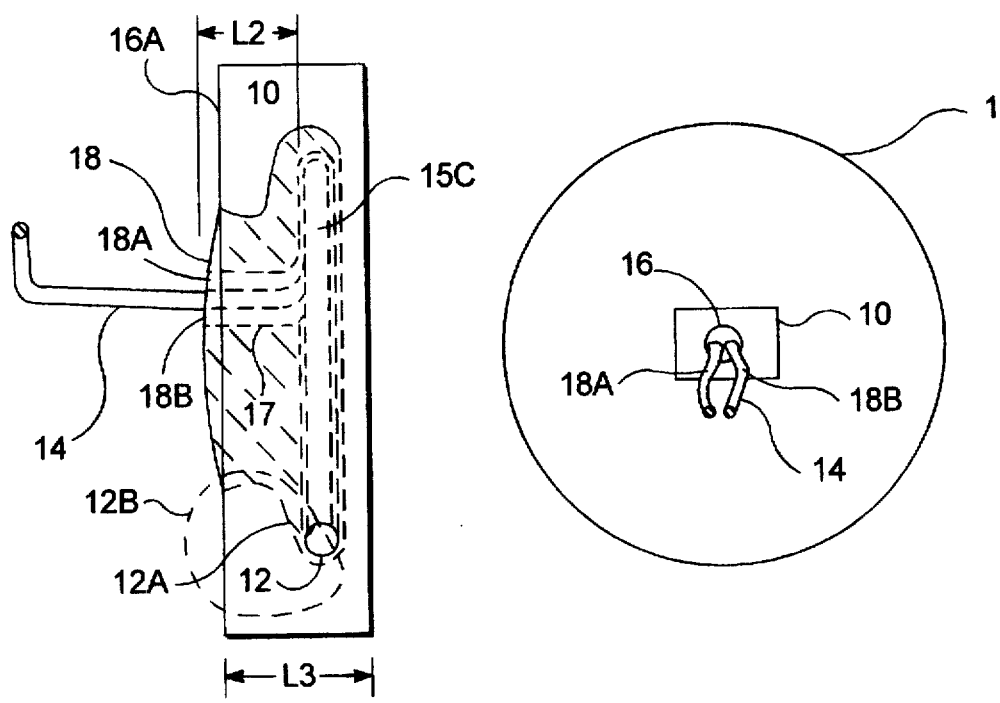
Figure 1C:
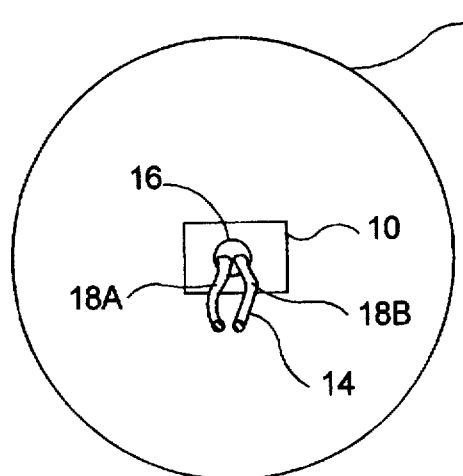
FIG. 1C is a top view illustrating a temperature calibration wafer in accordance with the first preferred embodiment of the invention.

Referring to the drawings, FIGS. 1A and 1C are top views of the first preferred embodiment of the invention. Wafer substrate 10 of FIG. 1A is an enlarged portion of wafer 1 shown in FIG. 1C. In the first embodiment, wafer substrate 10 contains within the substrate material a blind circular re-entrant cavity 13 with interior diameter 12 and cavity opening 16. A circular formation of thermocouple wire 14 and thermocouple junction 15 is encapsulated in a re-entrant cavity 13. The encapsulation of thermocouple wire 14 and thermocouple junction 15 in the interior perimeter of a blind re-entrant cavity 13 provides near isothermal conditions in the region of thermocouple junction 15. FIG. 1B is a side view illustrating thermocouple wire 14 projecting through cavity opening 16 and bond material 18. Bond material 18 is a ceramic and has minimal surface area in order to minimize the errors associated with the absorption and emissivity of infrared radiation by the bond material. The bond material 18 provides heat transfer means between wafer substrate 10 and thermocouple wire 14. Insulation coating 17 is formed on thermocouple wire 14 prior to the insertion of thermocouple wire 14 in re-entrant cavity 13. The insulation coating 17 sheaths and chemically isolates thermocouple wire 14 from the silicon of wafer substrate 10 and thereby prevents silicide formation at high temperatures. Thermocouple junction 15 is also enclosed and chemically isolated by insulation coating 17. Insulation coating 17 and bond material 18 may be the same or different materials.

The process for forming the first preferred embodiment will now be described with reference to FIGS. 1A and 1B. A hole is ground in wafer substrate 10 with a cutting tool, and the re-entrant cavity 13 is then ground using a high speed cutter. Thermocouple wire 14 is formed by welding two alloys of thermocouple wire by conventional techniques such as capacitive discharge welding. Typically, type K,R, S, and T thermocouples are fabricated and utilized in this invention. Next, thermocouple junction 15 and thermocouple wire 14 are sheathed in insulating coating 17. Insulating coating 17 is applied to thermocouple wire 14 and thermocouple junction 15 by the technique of dip coating.

As will be apparent to those skilled in the art, other methods such as plasma spraying, chemical-vapor deposition (CVD), or physical vapor-deposition (PVD) may alternatively be used. Additionally, alternatives such as small ceramic bobbins may also be used to isolate thermocouple wire 14 and thermocouple junction 15 from the silicon of wafer substrate 10. Thermocouple junction 15 along with thermocouple wire 14 are then inserted and seated in re-entrant cavity 13 of wafer substrate 10. Thermocouple wire 14 leads are projected through cavity opening 16. Cavity opening 16 is then filled with a bond material 18 consisting of a ceramic slurry. Bond material 18 is conformal to the geometry of re-entrant cavity 13 and cements thermocouple wire 14 and thermocouple junction 15 within wafer substrate 10. Further, bond material 18 has the same coefficient of thermal expansion as the silicon of wafer substrate 10 and is typically constituted from a mixture of $SiO_2$ and $Al_2O_3$.

Referring to FIGS. 1A and 1B, in this and all the following embodiments the diameter D of thermocouple wire 14 should be kept small with respect to the path length traversed in the various cavities described. The path length traversed is the distance from wire entrance into the cavity, shown as L2, plus the wire distance in the cavity to the junction of the thermocouple, shown as L1. A desirable aspect ratio of path length L1+L2 to wire diameter D should be greater than a ratio of 15 to 1.

As clearly shown in FIGS. 1A–1C, the cavity 13 in the substrate 10 has a cavity opening 16 at a surface 16A of the substrate 10 and an inner wall (generally 12A) defining an inside shape of said cavity 13. The thermocouple comprises a first lead wire 15A, a second lead wire 15B and a thermocouple junction 15. The first and second lead wires enter the cavity at respective first and second locations 18A and 18B. The thermocouple junction 15 is positioned at a third location in said cavity. The third location is a first particular distance from the first location and second particular distance from the second location. The first and second lead wires extend along respective paths from the locations 18A, 18B to the location 15, shaped to have lengths within the cavity. The length of the path of the first lead wire is greater than the distance from the location 18A to the locations 15 in the cavity.

Figure 3A:
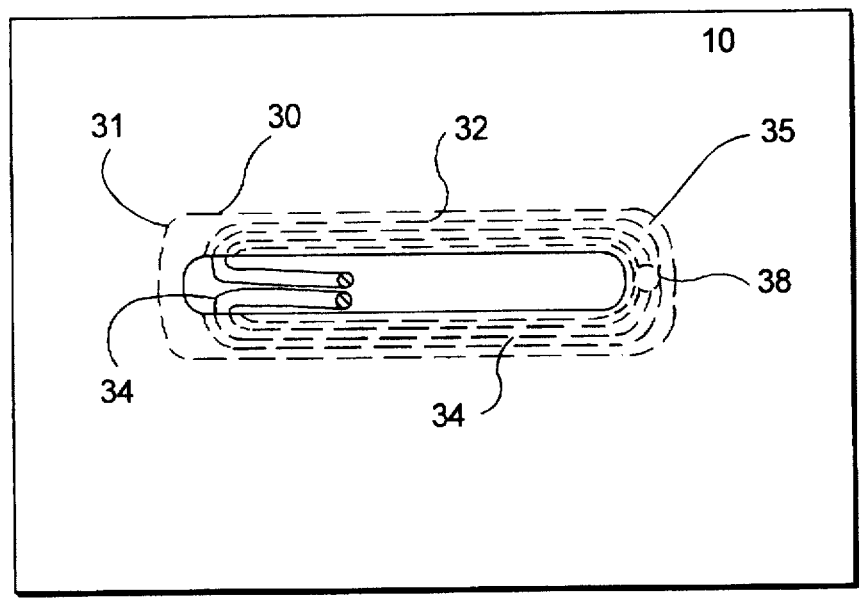
FIGS. 3A and 3B are a top view and side view, respectively, illustrating a temperature calibration wafer with a trench geometry re-entrant cavity in accordance with the third preferred embodiment of the present invention.

The cavity has a depth L3 along a first dimension substantially perpendicular to the surface of the substrate 10 which extends from the cavity opening to the bottom surface of the cavity. The cavity has a width L4 along a second dimension substantially parallel to the surface. The paths of the first and second lead wires include segments (e.g. segment 15C) nearer to the bottom surface of the cavity than to the cavity opening. Also the segments have lengths that are at least one half of the width, and as shown in FIG. 1C substantially more than one half of the width because of their arcuate shape. As can be seen in FIG. 1A, the width of the cavity against which the respective lengths of the segments is measured is the maximum width of the cavity. In alternatives, such as shown in FIG. 3A, the width of the cavity along which the segments of the thermocouple wires extend is substantially greater than the width in opposite directions.

As can be seen in the embodiment of FIGS. 4A–4C, the inner wall of the cavity defines an annular shape. In this embodiment, the cavity has a depth along a dimension substantially perpendicular to the surface from the cavity opening to an annular bottom surface of the inner wall of the cavity. The cavity has a width along a second dimension substantially parallel to the surface. The paths of the first and second lead wires include segments nearer the annular bottom surface of the inner wall of the cavity than to the cavity opening, and those segments have lengths at least one half of the width, and preferably substantially greater than one half of the width.

Also as shown in FIGS. 1A–1C, the inner wall in one embodiment includes a reentrant side surface (see region encircled by the dashed lines 12B). The reentrant side surface connects the bottom surface of the cavity to the opening of the cavity. The thermocouple junction 15 is closer to the side surface than to the cavity opening. Also, the thermocouple junction is closer to the bottom surface than to the cavity opening. Finally, as is clear from the Figure, the lengths of the segments of the thermocouple wires within the cavity are greater than the depth of the cavity.

Figure 2A:
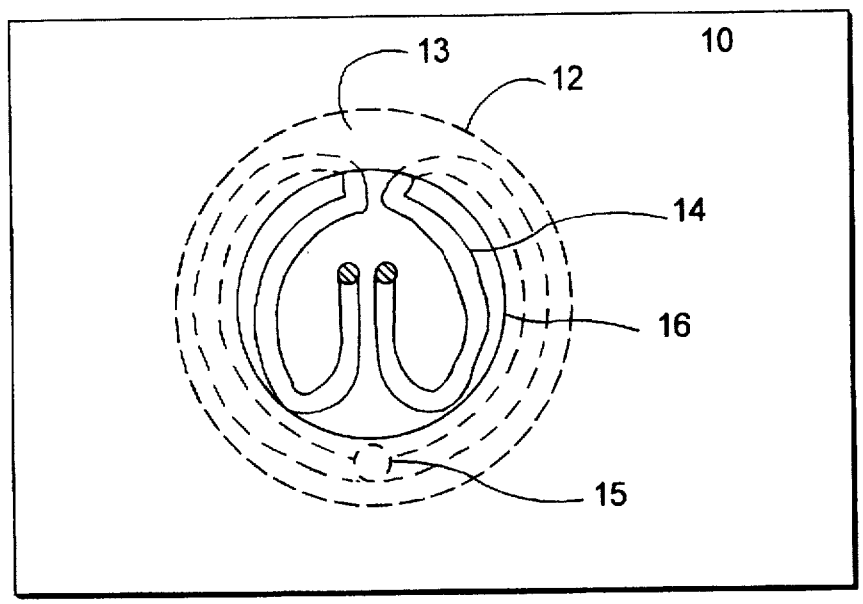
FIGS. 2A and 2B are a top view and side view, respectively, illustrating a temperature calibration wafer in accordance with the second preferred embodiment of the present invention.
Figure 2B:
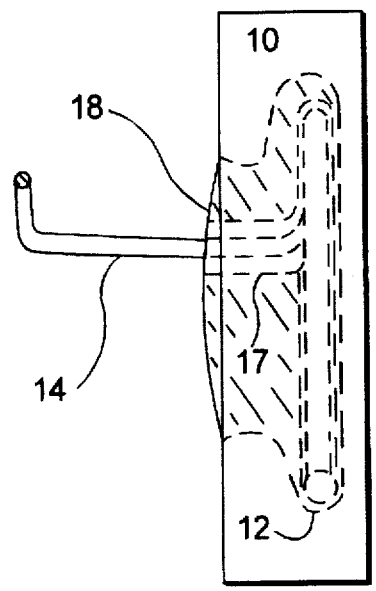

FIGS. 2A and 2B are a top view and side view, respectively, illustrating the temperature calibration wafer in accordance with the second preferred embodiment of the invention. The elements in this embodiment are the same as those described in the first preferred embodiment, and depicted in FIGS. 1A and 1B with the exception of thermocouple wire 14. FIG. 2A depicts thermocouple wire 14 formed over a longer serpentine path which provides greater heat transfer efficiency in this embodiment. FIG. 2B shows thermocouple wire 14 sheathed by insulating coating 17 and projecting through bond material 18 in the same manner as described with respect to the first preferred embodiment.

The process for forming the second preferred embodiment will now be described with reference to FIG. 2A. Thermocouple wire 14 is formed into a ribbon geometry prior to insertion into re-entrant cavity 13 to provide a greater contact area between the thermocouple wire 14 the substrate material. Re-entrant cavity 13 is formed and, thermocouple wire 14 and thermocouple junction 15 are bonded into it in the same manner as described with respect to the first preferred embodiment. Similarly, thermocouple junction 15 and insulation coating 17 are formed as described in the first preferred embodiment. Furthermore, wafer substrate 10 is formed and bond material 18 is utilized in the same manner as described with respect to the first preferred embodiment.

Figure 3B:
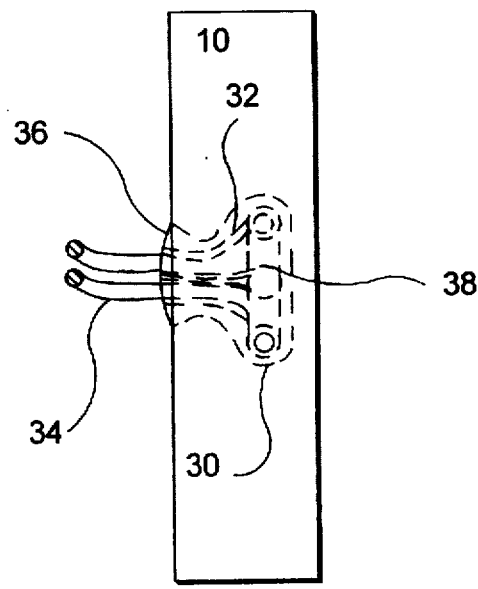

A third preferred embodiment of the invention is depicted in FIGS. 3A and 3B. In this embodiment wafer substrate 10 contains within the substrate material an elongated re-entrant cavity 35 with interior perimeter 30 and cavity opening 31. Thermocouple wire 34 projects through cavity opening 31 and bond material 36 as illustrated in FIGS. 3A and 3B. Thermocouple junction 38 is the weld joining the two alloys of thermocouple wire 34. Both thermocouple wire 34 and thermocouple junction 38 are sheathed in insulating coating 32 which chemically isolates thermocouple wire 34 from the silicon of wafer substrate 10. Insulating coating 32 is formed on thermocouple wire 34 and thermocouple junction 38 prior to placement of thermocouple wire and thermocouple junction 38 in elongated re-entrant cavity 35. The function of the trench geometry of elongated re-entrant cavity 35 is to provide a longer interior path length and hence improve the heat transfer between the silicon of wafer substrate 10 and thermocouple wire 34.

The process for forming the third preferred embodiment will now be described with reference to FIG. 3A. A cutting tool is placed on a region of wafer substrate 10 and wafer substrate 10 is ground to the requisite depth. The cutting tool is then traversed laterally to produce cavity opening 31 and the re-entrant cavity 35 in wafer substrate 10. Thermocouple wire 34 and thermocouple junction 38 are formed and inserted in re-entrant cavity 35 in the same manner as described with respect to the first preferred embodiment. Furthermore, insulating coating 32 and bond material 36 are both formed and utilized in the same manner as described with respect to the first preferred embodiment.

FIG. 4A is a top view depicting a temperature calibration wafer in accordance with the fourth embodiment of the invention. Wafer substrate 10 contains within the substrate material an annular cavity 41 with outer diameter 40 and inner diameter 43. Thermocouple wire 44 and thermocouple junction 48 are located within annular cavity 41. Ceramic filler 45, depicted in cross-sectional view FIG. 4C, provides improved heat transfer between wafer substrate 10 and thermocouple junction 48. Insulating coating 42 sheaths and chemically isolates both thermocouple wire 44 and thermocouple junction 48. The Insulating coating 42 is formed on thermocouple wire 44 and thermocouple junction 48 prior to insertion of wire and junction into annular cavity 41.

FIGS. 4B–4D illustrate the placement of cap 46 in the completed assembly. As shown in FIGS. 4B and 4D, the cap 46 is welded to substrate 10 in weld area 47 in accordance with this particular embodiment. The cap 46 covers a majority of annular cavity 41 and reduces the radiant surface area of ceramic filler 45. The reduction in the radiant surface area of ceramic filler 45 allows the surface emissive and absorptive characteristics of the annular cavity 41 region to more closely match those of the wafer substrate 10. This improves both the transient response and steady-state temperature measurement accuracy of the assembly.

The process for forming the fourth preferred embodiment will now be described with reference to FIGS. 4A through 4D. Wafer substrate 10 is drilled with a core drill to form annular cavity 41 shown in FIG. 4A. Thermocouple wire 44, thermocouple junction 48, and insulating coating 42 are all formed and utilized in the same manner as described with respect to the first preferred embodiment. Thermocouple wire 44 and thermocouple junction 48, both sheathed in insulating coating 42, are seated in annular cavity 41. Annular cavity 41 is then filled with ceramic filler 45 which consists of a ceramic slurry.

Cap 46 has similar or the same emissive and absorptive characteristics of wafer substrate 10 and is placed within cavity outer diameter 40 to cover the ceramic filler 45. The cap 46 is held in place by a bond material, or it is welded in place using conventional techniques such as laser welding, plasma welding or electron beam welding. The leads of thermocouple wire 44 project up through ceramic filler 45 and silicon cap 46 as illustrated in FIGS. 4B and 4D.

Referring to FIGS. 5A and 5B, a top view and side view, respectively, of a fifth preferred embodiment are shown. FIG. 5A illustrates a wafer substrate 10 with a cylindrical hole 52 and thermocouple wire 50. FIG. 5C shows insulating coating 51 which sheaths and chemically isolates thermocouple wire 50. Also illustrated in FIG. 5C is an elongated trench cavity 53 along the bottom side interior of wafer substrate 10. Thermocouple wire 50 runs along the length of elongated trench cavity 53 turns a right angle and projects up through cylindrical hole 52 and past the surface of wafer substrate 10. Thermocouple junction 54 is the weld joining the two alloys of thermocouple wire 50. Cover plate 56 made of silicon is welded or bonded in stepped recess 55 on the bottom side of wafer substrate 10 to provide a bottom surface similar in emissivity and absorption to the silicon of wafer substrate 10. The advantage of this particular embodiment is that the radiant surface area of the insulating coating 51 is minimized and hence the surface emissivity and absorption in the region surrounding cylindrical hole 52 closely matches that of the silicon of wafer substrate 10. A further advantage of this particular embodiment is that the path length of thermocouple wire 50 is increased thus establishing improved thermal contact.

The process for forming the fifth preferred embodiment will now be described with reference to FIGS. 5A through C. Cylindrical hole 52 shown in FIGS. 5A and 5C is ground from the top surface of wafer substrate 10 through the bottom surface of wafer substrate 10 with a cylindrical cutting tool. Next, the cutting tool is moved to the bottom surface of wafer substrate 10 and placed in one cylindrical hole 52 to an appropriate depth. It is then traversed to the other cylindrical hole 52. Elongated trench cavity 53 is ground in this manner. Finally, the cutting tool is indexed and stepped recess 55 is ground on the bottom surface of wafer substrate 10. Thermocouple wire 50, thermocouple junction 54, and insulating coating 51 are all formed and utilized in the same manner as described with respect to the first preferred embodiment. Thermocouple wire 50 and thermocouple wire junction 54 are inserted in elongated trench cavity 53 from the bottom surface of wafer substrate 10. Each lead of thermocouple wire 50 is projected through a cylindrical hole 52 as shown in FIG. 5C. Cover plate 56 is then placed in stepped recess 55. Cover plate 56 is attached to the bottom surface of wafer substrate 10 by a bonding material or by using conventional welding techniques such as laser welding, plasma welding, or electron beam welding.

A few preferred embodiments have been described in detail hereinabove. It is to be understood that the scope of the invention also comprehends embodiments different from those described, yet within the scope of the claims.

Although the present invention has been described in relation to particular embodiments thereof, many other variations and modifications and other uses will become apparent to those skilled in the art. It is preferred, therefore, that the present invention should be limited not by the specific disclosure herein, but by the appended claims.

What is claimed is:

1. A temperature sensor instrumented substrate for producing increased temperature measurement accuracy, comprising:

a substrate;

a cavity in said substrate, said cavity having a cavity opening at a surface of said substrate and an inner wall defining an inside shape of said cavity;

a thermocouple comprising first and second lead wires and a thermocouple junction disposed in said cavity so that the first and second lead wires enter the cavity opening at respective first and second locations and the thermocouple junction is positioned at a third location in said cavity, the third location being a first particular distance from said first location and being a second particular distance from said second location, and so that the first and second lead wires extend along respective paths shaped to have lengths within said cavity the length of the respective path of the first lead wire being greater than the first particular distance; and heat conductive material in said cavity for transferring heat from said substrate to said thermocouple.

2. A substrate as in claim 1 wherein said first lead wire of said thermocouple has a diameter and wherein the length of the path of said first lead wire within said cavity is substantially greater than said diameter of said first lead wire of said thermocouple.

3. A substrate as in claim 2 wherein said length of the path of said first lead wire is greater than fifteen times said diameter of said first lead wire within said cavity.

4. A substrate as in claim 3 wherein said cavity opening is at least substantially covered with a cap for covering said heat conductive material, and wherein said cap has substantially the same emissive and absorptive characteristics as said surface of said substrate.

5. A substrate as in claim 4 wherein said first and second lead wires extend through said cap.

6. A substrate as in claim 5 where said heat conductive material includes:

an insulation coating formed around said first and second lead wires of said thermocouple for preventing said thermocouple from chemically reacting with said substrate; and a bond material formed between said insulation coating and said substrate, said bond material having substantially the same coefficient of thermal expansion as said substrate.

7. The substrate of claim 1 wherein the inside shape of the cavity defines a reentrant wall cavity.

8. The substrate of claim 7 wherein the reentrant wall cavity is elongated.

9. The substrate of claim 7 wherein the reentrant wall cavity is circular.

10. The substrate of claim 1, wherein the length of the respective path of the second lead wire is greater than the second particular distance.

11. The substrate of claim 1, wherein the cavity has a depth along a first dimension substantially perpendicular to the surface from the cavity opening to a bottom surface of the inner wall of the cavity, and a width along a second dimension substantially parallel to the surface, and wherein the paths of the first and second lead wires include respective segments nearer to the bottom surface of the inner wall than to the cavity opening, and the segments have respective lengths at least about one half of said width.

12. The substrate of claim 11, wherein the segments have respective lengths greater than said width.

13. The substrate of claim 11, wherein said width is the maximum width of said cavity.

14. The substrate of claim 13, wherein the segments have respective lengths greater than said width.

15. The substrate of claim 11, wherein the inner wall includes a side surface connecting the bottom surface to the opening, and wherein the thermocouple junction is closer to the side surface than to the cavity opening.

16. The substrate of claim 15, wherein the thermocouple junction is closer to the bottom surface than to the cavity opening.

17. The substrate of claim 15, wherein the inner shape of said cavity is annular.

18. The substrate of claim 1, wherein the inner shape of said cavity is annular.

19. The substrate of claim 18, wherein the cavity has a depth along a first dimension substantially perpendicular to the surface from the cavity opening to an annular bottom surface of the inner wall of the cavity, and a width along a second dimension substantially parallel to the surface, and wherein the paths of the first and second lead wires include segments nearer to the annular bottom surface of the inner wall of the cavity than to the cavity opening, and the segments have respective lengths at least about one half of said width.

20. The substrate of claim 19, wherein the segments have respective lengths greater than said width.

21. The substrate of claim 19, wherein said width is the maximum width of said cavity.

22. The substrate of claim 21, wherein the segments have respective lengths greater than said width.

23. The substrate of claim 18, wherein the length of the respective path of the second lead wire is greater than the second particular distance.

24. The substrate of claim 1, wherein the third location at which the thermocouple junction is positioned is adjacent the inner wall of the cavity.

25. The substrate of claim 1, wherein the cavity has a depth along a first dimension substantially perpendicular to the surface from the opening to a bottom surface of the inner wall of the cavity, and a width along a second dimension substantially parallel to the surface, and wherein the inner wall includes a re-entrant side surface connecting the bottom surface to the opening, and wherein the thermocouple junction is closer to the side surface than to the cavity opening.

26. The substrate of claim 25, wherein the thermocouple junction is closer to the bottom surface than to the cavity opening.

27. The substrate of claim 1, wherein the cavity has a depth along a first dimension substantially perpendicular to the surface from the cavity opening to a bottom surface of the inner wall of the cavity, wherein the lengths of the respective paths of the first and second lead wires are greater than said depth.

28. A temperature sensor instrumented substrate for producing increased temperature measurement accuracy, comprising:

a semiconductor substrate;

a cavity in the substrate, wherein the cavity has an inner surface and a cavity opening in a surface of the substrate;

a thermocouple including first and second lead wires and a thermocouple junction disposed within the cavity to measure the temperature of the substrate; and a heat transfer medium disposed within the cavity and surrounding a first length of said first lead wire, a second length of said lead wire, and said thermocouple junction, wherein the heat transfer medium is effective for transferring heat from the substrate to the thermocouple, wherein the first lead wire has a diameter, and the ratio of the first length traversed by the first lead wire to the diameter of the first lead wire is at least fifteen to one.

29. The substrate of claim 28 wherein the cavity opening is at least substantially covered with a cap for covering the heat transfer medium, and wherein the cap has the same emissive and absorptive characteristics as the surface of the substrate.

30. The substrate of claim 28 wherein the cavity is a reentrant wall cavity.

31. The substrate of claim 30 wherein the reentrant wall cavity is elongated.

32. The substrate of claim 30 wherein the reentrant cavity is circular.

* * * * *